(No Model.) 2 Sheets—Sheet 2.
G. J. NOPPER.
BUTTON HOLE SEWING MACHINE.
No. 464,287. Patented Dec. 1, 1891.
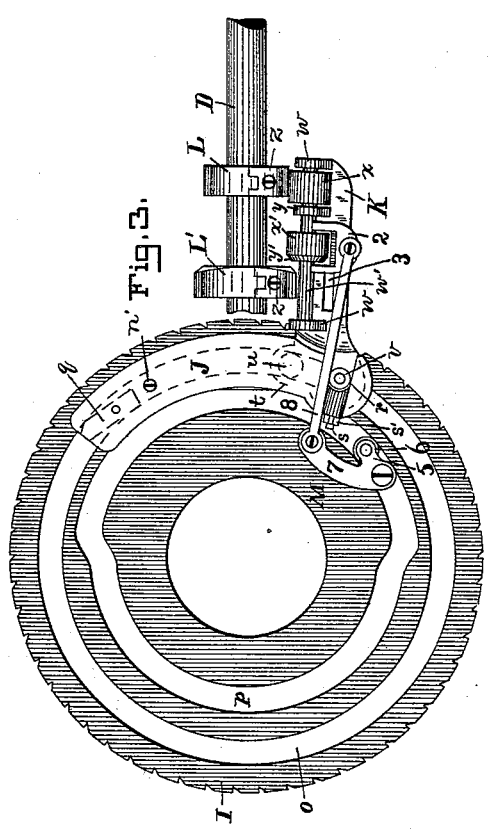
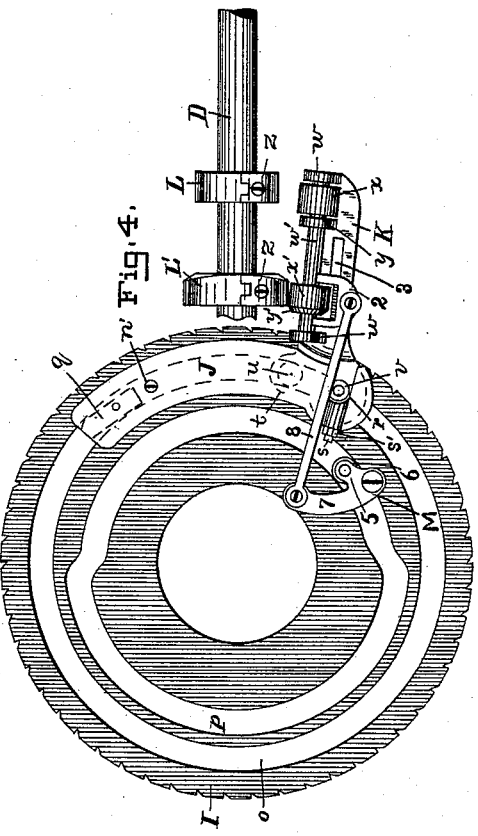
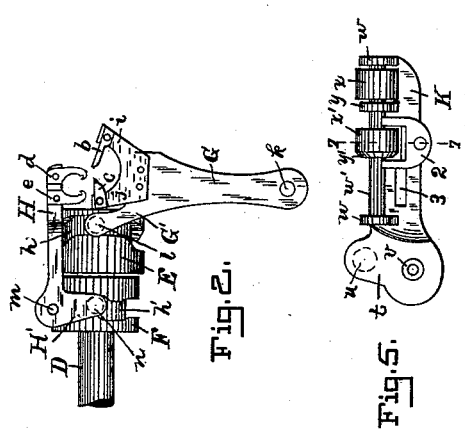
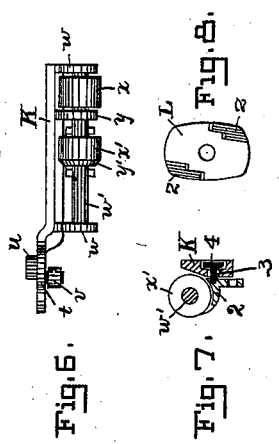
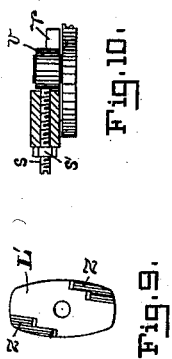
WITNESSES:
Otto H. Ehlers.
F. P. Davis.
INVENTOR:
George J. Nopper,
BY Chas. B. Mann
ATTORNEY.

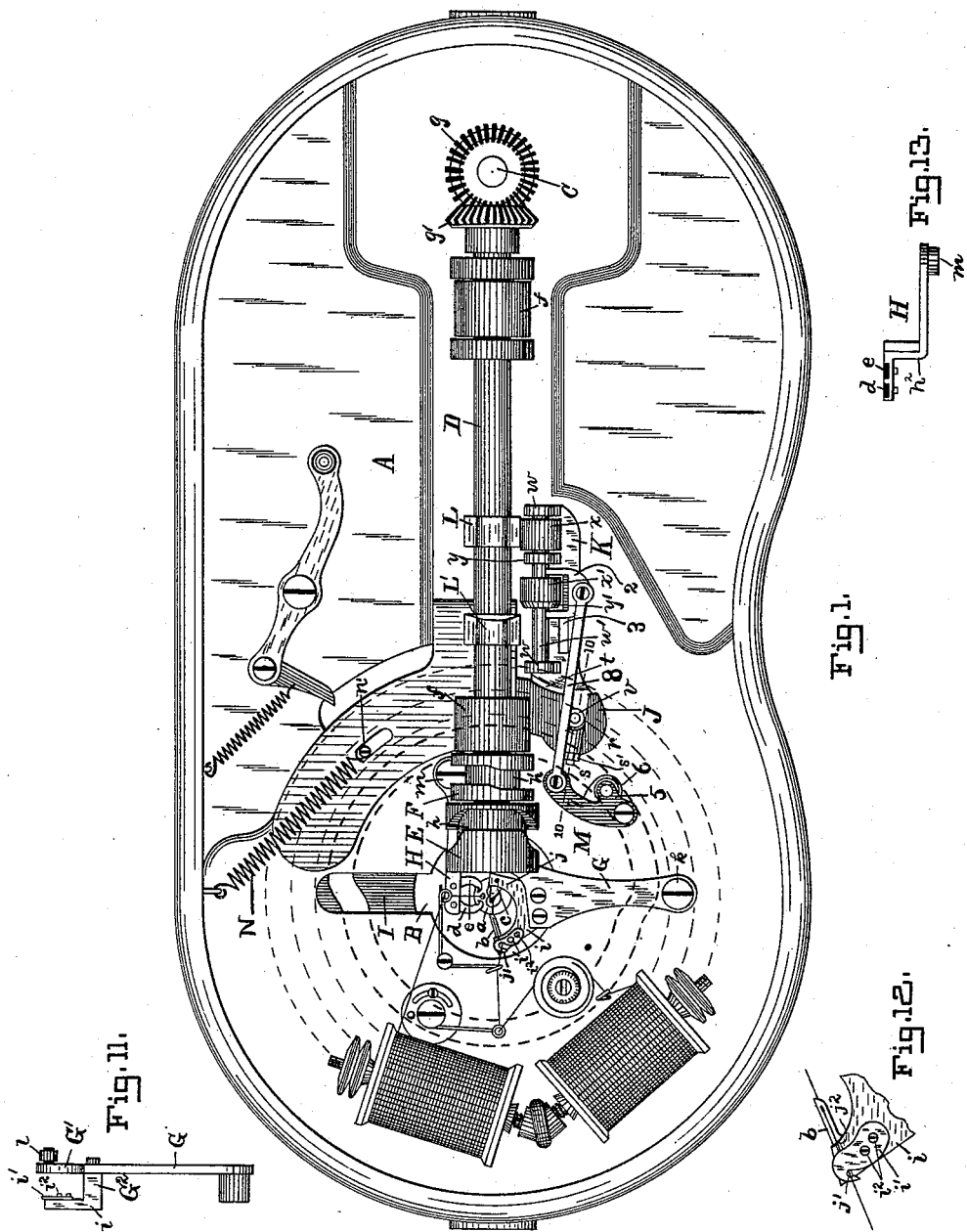

UNITED STATES PATENT OFFICE.

GEORGE J. NOPPER, OF BALTIMORE, MARYLAND.

BUTTON-HOLE SEWING-MACHINE.

SPECIFICATION forming part of Letters Patent No. 464,287, dated December 1, 1891.

Application filed June 18, 1891. Serial No. 396,695. (No model.)

*To all whom it may concern:*

Be it known that I, GEORGE J. NOPPER, a citizen of the United States, residing at Baltimore city, in the State of Maryland, have invented certain new and useful Improvements in Button-Hole Sewing-Machines, of which the following is a specification.

This invention relates to certain improvements in the feeding mechanism of button-hole sewing-machines, which improvements will be fully described hereinafter, and pointed out in the claims.

The invention is illustrated in the accompanying drawings, in which—

Figure 1 represents a bottom view of a button-hole sewing-machine embodying my improvements. Fig. 2 represents a top view of the looper and spreader levers and cam-grooved rollers for actuating the same. Fig. 3 represents a bottom view of the parts composing the feed mechanism, showing the short cam actuating the driving-lever. Fig. 4 represents a similar view showing the long cam actuating the driving-lever. Fig. 5 represents a detail bottom view of the driving-lever. Fig. 6 represents a side view of the same. Fig. 7 represents a cross-section on line 7 7 of Fig. 5. Figs. 8 and 9 represent detail views of the two cams on the horizontal drive-shaft. Fig. 10 represents an enlarged cross-section on line 10 10 of Fig. 1. Fig. 11 represents a side or edge view of the looper-lever. Fig. 12 represents a detail view of the arm of said lever which carries the long looper, showing my improved thread-guard. Fig. 13 represents a side or edge view of the spreader-lever.

The letter A designates the bed-plate of the machine; B, the cloth-plate above the same; $a$, the button through which the needle passes in its up and down movements; $b\ c$, the long and short loopers, respectively, and $d\ e$ the two spreaders.

The stitch and the movements of the needle, loopers, and spreaders in forming said stitch are the same as in the ordinary button-hole sewing-machine, and hence it will not be necessary to enter into a description thereof here.

My invention is in the means and mechanism for driving the feed-wheel.

The letter C designates a vertical drive-shaft at the right-hand end of the machine, and D a horizontal drive-shaft mounted in bearings $f$ beneath the bed-plate and connected with the vertical shaft C and driven thereby through miter-gear $g\ g'$. The horizontal shaft D extends to the opening in the bed-plate in which the loopers and spreaders operate, and at this end has rigidly mounted upon it a pair of rollers E and F, each of which is provided in its periphery with an encircling cam-groove $h\ h'$.

The loopers $b\ c$ are rigidly attached to two oppositely-curved arms $i\ j$, projecting from the end of a lever G, which extends over the bed-plate and is pivoted thereto at its opposite end by a screw $k$. A vertical block $G^2$ is interposed between the arms $i\ j$ and lever G, as shown in Fig. 11, to bring the loopers up to the proper position below the cloth-plate. This block is preferably formed integral with said arms $i\ j$. On the lower side of the arm $i$, carrying the long looper, is fastened a thread-guard, which comprises a thin plate $i'$, detachably secured to the arm by screws $i^2$, and having a hooked end $j'$. The thread is passed behind this plate and brought out at one side over the hook $j'$, and at the other through a groove $j^2$ in the arm $i$, and thence through the looper $b$, as shown in Fig. 12. By this means the thread is held properly on the looper and prevented from doubling up and throwing off the loop of the upper thread. The lever G has a lateral arm G', extending behind the roller E, which is on the end of the drive-shaft D, and carrying a roller $l$, which engages in the cam-groove $h$ of said roller E. This groove is of such form that the looper-lever is caused to vibrate on its pivot $k$ by the revolution of the roller, and imparts to the loopers the desired back-and-forth movement in the formation of the stitch. The spreaders $d\ e$ reciprocate in a direction at right angles to the line of movement of the loopers, and they are rigidly secured to the end of one arm H of a bent or elbow lever which is pivoted at $m$ to the bed-plate. This arm H has a bend $h^2$, as shown in Fig. 13, to bring the spreaders up against the cloth-plate and behind the loopers. The other arm H' of the elbow-lever extends behind the roller F, which is mounted on the drive-shaft D alongside the roller E and carries a roller $n$ on its end which engages in the cam-groove $h'$ of the said roller F. The form of this groove $h'$ is such as to impart to the arm H' of the elbow-lever during the revolution of the roller F a vibrating movement and to the arm H and spreaders d e the desired reciprocating motion to spread the loops at the proper time in the formation of the stitch. The two cam-grooved rollers E F are relatively timed by adjusting them on the drive-shaft to secure the proper movements of the loopers and speaders in relation to each other.

The feed-wheel I is of the usual form, and revolves between the bed-plate and cloth-plate. It has in its under surface near its periphery a circular feed-groove o, and inside this feed-groove, nearer the center of the wheel, a cam-groove p, one half of which is of larger circumference than the other half. A curved feed lever or dog J fits over a portion of the feed-groove o, and has at one end a detachable cramping-block q, engaging in said groove. The opposite end of this feed-lever has a depression r in the outer side, forming a socket, and a transverse screw s, adapted to be advanced into said socket through the base of the same and provided with a lock-nut s'. Behind this end of the feed-lever is disposed one end of a driving-lever K, which has a short arm t, extending on an angle beneath the feed-lever toward the opposite end of the same. This arm carries a roller u, engaging in the feed-groove o. The driving-lever also has a stud v, which engages in the depression or socket r of the feed-lever and bears against the end of the screw s. This driving-lever is in the form of a plate, extending over the bed-plate A, and has a pair of standards w, located at opposite ends, which support a shaft w'. This shaft carries two rollers x x', one of which x is located at the right-hand end of the shaft and is held permanently in one position thereon by a standard or shoulder y, and the other x' slides on the shaft and has a coned end y'.

The drive-shaft D carries a short and a long cam L L', the short cam to engage the permanent roller x and the long cam to intermittently engage the movable roller x'. Each cam has an approximately oval shape and is provided on diagonally-opposite corners with longitudinally-adjustable blocks z, by means of which its stroke may be regulated for different-length steps in the feed motion and to compensate for wear. The sliding roller x' is moved in a carriage 2, which works in a longitudinal slot or guideway 3 in the lever or plate K, said carriage having screws 4, extending through said slot, with their heads taking over the inside face of the said plate K, as shown in Fig. 7. A shipper-lever M is pivoted to the bed-plate A, and has a short arm 5, carrying a roller 6, engaging in the cam-groove p of the feed-wheel, and a longer arm 7, which is connected by a rod 8 to the carriage 2, containing the roller x'.

The operation of this feed mechanism is as follows: When the roller 6 of the shipper-lever M is traveling in the large half of the cam-groove p in the feed-wheel, (see Fig. 3,) the sliding roller x' is clear of the cam L', and the short cam L acts on the permanent roller x and imparts to the driving-lever K a rocking movement. In this rocking movement of the driving-lever the roller u in the feed-groove acts as a fulcrum and causes said driving-lever to press with its stud v against the lower end of the feed-lever J and cramp the block q of the latter in the feed-groove, and then move the feed-lever, and with it the feed-wheel. This comprises one step of the feed-wheel revolution. A spiral spring N connects the feed-lever and bed-plate, and draws back the said feed-lever, and with it the driving-lever, for another stroke, the block q and roller u moving back freely in the feed-groove. This spring is connected to a screw n', projecting from the feed-lever through a slot in the bed-plate, as seen in Fig. 1. A suitable brake is provided to prevent a backward motion of the feed-wheel. In order to lengthen the movement of the driving-lever at the proper time, I have provided the long cam L' and sliding roller x'. When the roller 6 of the shipper-lever enters into the smaller half of the cam-groove p, (see Fig. 4,) the arm 7 of said lever is obviously thrown in toward the center of the feed-wheel, and hence draws the rod 8 to the left. This, it will be observed, shifts the carriage 2 in the slot 3, and with it the roller x', sliding the latter under the long cam L', the coned end y' of the said roller assisting it in readily taking this position. Now it will be seen that the short cam no longer bears on the roller x and works the driving-lever; but the long cam L' engages the roller x' and imparts the rocking motion to the driving-lever, and being of greater length than the other cam, and also nearer the pivotal point of the driving-lever, it gives the latter a greater throw and lengthens the steps of the feed motion until the roller 6 of the shipper-lever again enters the larger part of the cam-groove in the feed-wheel, when the sliding roller is shifted back to the right and out of engagement with the cam L'. The short cam now again imparts the rocking motion to the driving-lever. Except while passing from the small part to the large part of the cam-groove in the feed-wheel, the shipper-lever is stationary. The movement of the connecting-rod 8 as it describes an arc during the rocking of the driving-lever is taken up by the slot 3 in the said driving-lever, said slot being made of sufficient length to allow for this movement of the rod. The purpose of the screw s is to take up wear of the feed-lever cramping-block and maintain a uniform stroke of the driving-lever. When the block wears so as to affect the stroke, the said screw is advanced into the socket or depression r, to receive the impact of the stud v.

It is evident that the construction and arrangement of parts here shown and described are susceptible of changes and modifications.

I am not, therefore, limited to such construction and arrangement, but consider myself entitled to all such variations therefrom as come within the spirit and scope of my invention.

Having thus described my invention, what I claim as new, and desire to secure by Letters Patent, is—

1. In a button-hole sewing-machine, the combination of a feed-wheel having a feed-groove and a cam-groove, a vibrating driving-lever having a roller engaging in the said feed-groove and a movable contact part to receive the impact of the driving mechanism, means actuated by said vibrating driving-lever for transferring motion to the feed-wheel, an independent shipper-lever pivoted to the bed-plate and having a roller engaging in the cam-groove of the feed-wheel, and a suitable connection between the said shipper-lever and the movable contact part of the driving-lever.

2. In a button-hole sewing-machine, the combination of a feed-wheel having a feed-groove and a cam-groove, a vibrating driving-lever having a roller engaging in the said feed-groove and carrying a permanent roller and a sliding roller, a drive-shaft carrying two cams, one to act against the permanent roller and the other against the sliding roller to vibrate the driving-lever, means actuated by said vibrating driving-lever for transferring motion to the feed-wheel, an independent shipper-lever pivoted to the bed-plate and having a roller engaging in the cam-groove of the feed-wheel, and a suitable connection between the said shipper-lever and the sliding roller of the driving-lever.

3. In a button-hole sewing-machine, the combination of a feed-wheel, a suitable feed-dog for actuating the same, a vibrating driving-lever for actuating said feed-dog, carrying a permanent roller and a sliding roller, a drive-shaft, two cams on said drive-shaft which act against the said permanent roller and sliding roller, respectively, to vibrate the driving-lever, mechanism for automatically shifting said sliding roller into and out of engagement with the cam on the drive-shaft, and a spring to hold the lever up to the cam.

4. In a button-hole sewing-machine, the combination of a feed-wheel having a feed-groove and a cam-groove, a vibrating driving-lever having a roller engaging in the said feed-groove and carrying a permanent roller and a sliding roller, a drive-shaft carrying two cams, one to act against the permanent roller and the other against the sliding roller, to vibrate the driving-lever, each cam having extension-pieces at opposite ends, means actuated by said vibrating driving-lever for transferring motion to the feed-wheel, an independent shipper-lever pivoted to the bed-plate and having a roller engaging in the cam-groove of the feed-wheel, and a suitable connection between the said shipper-lever and the sliding roller of the driving-lever.

5. In a button-hole sewing-machine, the combination of a feed-wheel having a feed-groove and a cam-groove, a vibrating driving-lever having a roller engaging in the said feed-groove and carrying a permanent roller and a sliding roller, a drive-shaft carrying two cams, one to act against the permanent roller and the other against the sliding roller to vibrate the driving-lever, a carriage in which said sliding roller moves, said carriage working in a slot in the driving-lever, means actuated by said vibrating driving-lever for transferring motion to the feed-wheel, an independent shipper-lever pivoted to the bed-plate and having a roller engaging in the cam-groove of the feed-wheel, and a rod connecting the said shipper-lever and the sliding-roller carriage.

6. In a button-hole sewing-machine, the combination of a feed-wheel having a feed-groove, a vibrating driving-lever having a roller engaging in the said feed-groove and a projecting stud, a feed-lever having a cramping-block at one end engaging in the feed-groove of the feed-wheel and a depression at its opposite end engaged by the projecting stud of the driving-lever, an adjustment-screw to enter said depression and receive the impact of the stud, and a retracting-spring connected to the feed-lever.

In testimony whereof I affix my signature in the presence of two witnesses.

GEORGE J. NOPPER.

Witnesses:
F. P. DAVIS,
JNO. T. MADDOX.